US009201711B2

(12) United States Patent
Ahmed et al.

(10) Patent No.: US 9,201,711 B2
(45) Date of Patent: *Dec. 1, 2015

(54) API AND BUSINESS LANGUAGE SCHEMA DESIGN FRAMEWORK FOR MESSAGE EXCHANGES

(71) Applicant: EBAY INC., San Jose, CA (US)

(72) Inventors: Zahid N. Ahmed, San Jose, CA (US); Alon Cohen, San Jose, CA (US); Daniel Tsun Kao, San Jose, CA (US); Ray Tanaka, San Jose, CA (US); Gary Yue, San Jose, CA (US); Bhaven Avalani, Cupertino, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/735,574

(22) Filed: Jan. 7, 2013

(65) Prior Publication Data

US 2013/0125147 A1    May 16, 2013

Related U.S. Application Data

(63) Continuation of application No. 12/984,461, filed on Jan. 4, 2011, now Pat. No. 8,352,968, which is a continuation of application No. 12/771,981, filed on Apr. 30, 2010, now Pat. No. 7,886,305, which is a (Continued)

(51) Int. Cl.
*G06F 9/54* (2006.01)
*G06Q 30/08* (2012.01)
*H04L 29/08* (2006.01)

(52) U.S. Cl.
CPC .......... *G06F 9/54* (2013.01); *G06Q 30/08* (2013.01); *H04L 67/02* (2013.01); *H04L 67/10* (2013.01); *G06F 2209/541* (2013.01)

(58) Field of Classification Search
None
See application file for complete search history.

(56) References Cited

U.S. PATENT DOCUMENTS 5,668,991 A    9/1997  Dunn et al.
5,717,924 A    2/1998  Kawai (Continued)

FOREIGN PATENT DOCUMENTS

WO    WO-2005052759 A2    6/2005
WO    WO-2005052759 A3    6/2005

OTHER PUBLICATIONS

"U.S. Appl. No. 10/997,767, Advisory Action mailed Apr. 23, 2009", 3 pgs.

(Continued)

*Primary Examiner* — Qing Wu
(74) *Attorney, Agent, or Firm* — Schwegman Lundberg & Woessner, P.A.

(57) ABSTRACT

A plurality of application servers hosts a plurality of business applications. A plurality of Application Program Interface (API) servers host a plurality of APIs to provide programmatic access to the plurality of business applications, each of the APIs configured to receive request messages compiled by a remote client application. First and second request messages targeted to first and second APIs have at least one common data component. The first request message includes a first payload specific to the first targeted API and the second request message includes a second payload specific to the second targeted API, the first payload and the second payload each comprise a reusable identified schema definition specific to the targeted API.

12 Claims, 11 Drawing Sheets

Related U.S. Application Data continuation of application No. 10/997,767, filed on Nov. 24, 2004, now Pat. No. 7,818,759.

(60) Provisional application No. 60/524,782, filed on Nov. 24, 2003.

(56) References Cited

U.S. PATENT DOCUMENTS

| | | | |
|---|---|---|---|
| 5,826,030 | A | 10/1998 | Hebert |
| 5,926,636 | A | 7/1999 | Lam et al. |
| 5,937,409 | A | 8/1999 | Wetherbee |
| 6,061,515 | A | 5/2000 | Chang et al. |
| 6,076,090 | A | 6/2000 | Burroughs et al. |
| 6,119,130 | A | 9/2000 | Nguyen |
| 6,324,693 | B1 | 11/2001 | Brodersen et al. |
| 6,370,566 | B2 | 4/2002 | Discolo et al. |
| 6,569,207 | B1 | 5/2003 | Sundaresan |
| 6,631,519 | B1 | 10/2003 | Nicholson et al. |
| 6,772,180 | B1 | 8/2004 | Li |
| 6,779,184 | B1 | 8/2004 | Puri et al. |
| 6,842,904 | B1 | 1/2005 | Bartz et al. |
| 6,847,974 | B2 | 1/2005 | Wachtel |
| 7,296,022 | B2 | 11/2007 | Harjanto |
| 7,403,956 | B2 | 7/2008 | Vaschillo et al. |
| 7,818,759 | B2 | 10/2010 | Ahmed et al. |
| 7,844,639 | B2 | 11/2010 | Cohen et al. |
| 7,886,305 | B2 | 2/2011 | Ahmed et al. |
| 8,121,978 | B2 | 2/2012 | Wiss et al. |
| 8,352,968 | B2 | 1/2013 | Ahmed et al. |
| 8,606,824 | B2 | 12/2013 | Cohen et al. |
| 9,058,343 | B2 | 6/2015 | Cohen et al. |
| 2002/0078094 | A1 | 6/2002 | Krishnaprasad et al. |
| 2003/0055828 | A1 | 3/2003 | Koch et al. |
| 2003/0110176 | A1 | 6/2003 | Morgan et al. |
| 2003/0191757 | A1 | 10/2003 | Ambrosini et al. |
| 2004/0010791 | A1 | 1/2004 | Jain et al. |
| 2004/0015783 | A1 | 1/2004 | Lennon et al. |
| 2004/0044959 | A1 | 3/2004 | Shanmugasundaram et al. |
| 2004/0075857 | A1 | 4/2004 | Akiyoshi et al. |
| 2004/0103098 | A1 | 5/2004 | Mitra |
| 2004/0216147 | A1 | 10/2004 | Yanosy et al. |
| 2005/0015439 | A1 | 1/2005 | Balaji et al. |
| 2005/0050056 | A1 | 3/2005 | Idicula |
| 2005/0138648 | A1 | 6/2005 | Ahmed et al. |
| 2005/0149543 | A1 | 7/2005 | Cohen et al. |
| 2010/0223633 | A1 | 9/2010 | Ahmed et al. |
| 2011/0035417 | A1 | 2/2011 | Cohen et al. |
| 2014/0040321 | A1 | 2/2014 | Cohen et al. |

OTHER PUBLICATIONS

"U.S. Appl. No. 10/997,767, Final Office Action mailed Feb. 4, 2009", 8 pgs.
"U.S. Appl. No. 10/997,767, Non Final Office Action mailed Feb. 22, 2008", 9 pgs.
"U.S. Appl. No. 10/997,767, Non-Final Office Action mailed Jul. 6, 2009", 13 pgs.
"U.S. Appl. No. 10/997,767, Notice of Allowance mailed Jan. 22, 2010", 13 pgs
"U.S. Appl. No. 10/997,767, Notice of Allowance mailed May 17, 2010", 9 pgs.
"U.S. Appl. No. 10/997,767, Response filed Apr. 6, 2009 to Final Office Action mailed Feb. 4, 2009", 3 pgs.
"U.S. Appl. No. 10/997,767, Response filed Jul. 22, 2008 to Non Final Office Action mailed Feb. 22, 2008", 10 pgs.
"U.S. Appl. No. 10/997,767, Response filed Nov. 6, 2009 to Non Final Office Action mailed Jul. 6, 2009", 11 pgs.
"U.S. Appl. No. 11/074,541, Advisory Action mailed Jan. 25, 2008", 3 pgs.
"U.S. Appl. No. 11/074,541, Advisory Action mailed Apr. 7, 2009", 3 pgs.
"U.S. Appl. No. 11/074,541, Examiner Interview Summary mailed May 19, 2010", 3 pgs.
"U.S. Appl. No. 11/074,541, Final Office Action mailed Jan. 26, 2009", 16 pgs.
"U.S. Appl. No. 11/074,541, Final Office Action mailed Mar. 1, 2010", 13 pgs.
"U.S. Appl. No. 11/074,541, Final Office Action mailed Nov. 1, 2007", 22 pgs.
"U.S. Appl. No. 11/074,541, Non Final Office Action mailed May 18, 2007", 22 pgs.
"U.S. Appl. No. 11/074,541, Non Final Office Action mailed Jul. 1, 2008", 16 pgs.
"U.S. Appl. No. 11/074,541, Non Final Office Action mailed Jul. 21, 2009", 18 pgs.
"U.S. Appl. No. 11/074,541, Notice of Allowance mailed Jul. 21, 2010", 19 pgs.
"U.S. Appl. No. 11/074,541, Response filed Jan. 2, 2008 to Final Office Action mailed Nov. 1, 2007", 24 pgs.
"U.S. Appl. No. 11/074,541, Response filed Mar. 26, 2009 to Final Office Action mailed Jan. 26, 2009", 11 pgs.
"U.S. Appl. No. 11/074,541, Response filed May 18, 2010 to Final Office Action mailed Mar. 1, 2010", 12 pgs.
"U.S. Appl. No. 11/074,541, Response filed Aug. 16, 2007 to Non Final Office Action mailed May 18, 2007", 22 pgs.
"U.S. Appl. No. 11/074,541, Response filed Nov. 3, 2008 to Non Final Office Action mailed Jul. 1, 2008", 17 pgs.
"U.S. Appl. No. 11/074,541, Response filed Nov. 23, 2009 to Non Final Office Action mailed Jul. 21, 2009", 12 pgs.
"U.S. Appl. No. 12/771,981 Supplemental Notice of Allowability Mailed Oct. 19, 2010", 12.
"U.S. Appl. No. 12/771,981, Notice of Allowance mailed Sep. 29, 2010", 14 pgs.
"U.S. Appl. No. 12/907,524 , Response filed Apr. 23, 2012 to Non Final Office Action mailed Feb. 28, 2012", 10 pgs.
"U.S. Appl. No. 12/907,524, Advisory Action mailed Sep. 13, 2012", 2 pgs.
"U.S. Appl. No. 12/907,524, Final Office Action mailed Jul. 2, 2012", 10 pgs.
"U.S. Appl. No. 12/907,524, Non final Office Action mailed Jan. 2, 2013", 9 pgs.
"U.S. Appl. No. 12/907,524, Non Final Office Action mailed Feb. 28, 2012", 9 pgs.
"U.S. Appl. No. 12/907,524, Response filed Sep. 4, 2012 sto Final Office Action mailed Jul. 2, 2012", 12 pgs.
"U.S. Appl. No. 12/907,524, Response filed Sep. 26, 2012 to Advisory Action mailed Sep. 13, 2012", 13 pgs.
"U.S. Appl. No. 12/984,461, Non Final Office Action mailed Apr. 19, 2012", 9 pgs.
"U.S. Appl. No. 12/984,461, Notice of Allowance mailed Sep. 7, 2012", 7 pgs.
"U.S. Appl. No. 12/984,461, Response filed Aug. 20, 2012 to Non Final Office Action mailed Apr. 19, 2012", 9 pgs.
"Web Services Description Language(WSDL) Version 1.2 Part3: Bindings, W3C Working Draft;", [Online]. Retrieved from the Internet: <URL: http://www.w3.org/TR/2003/WD-wsdl12-bindings-20030611>, (Jun. 11, 2003), 38 pgs.
Erik, D, "Norwegian University of Science and Technology", Improved Backward Compatibility and API Stability with Advanced Continous Integration, (Jun. 2007), 90 pgs.
"U.S. Appl. No. 12/771,981, Examiner Interview Summary mailed Sep. 22, 2010", 3 pgs.
"U.S. Appl. No. 12/771,981, Preliminary Amendment filed Oct. 7, 2010", 5 pgs.
"U.S. Appl. No. 12/907,524, Examiner Interview Summary mailed Apr. 8, 2013", 3 pgs.
"U.S. Appl. No. 12/907,524, Notice of Allowance mailed Apr. 10, 2013", 9 pgs.
"U.S. Appl. No. 12/907,524, Notice of Allowance mailed Aug. 6, 2013", 9 pgs.
"U.S. Appl. No. 12/907,524, Response filed Apr. 2, 2013 to Non Final Office Action mailed Jan. 2, 2013", 8 pgs.
"U.S. Appl. No. 14/051,750, Non Final Office Action mailed Oct. 15, 2014", 10 pgs.

(56) References Cited

OTHER PUBLICATIONS

"U.S. Appl. No. 14/051,750, Preliminary Amendment filed Oct. 15, 2013", 8 pgs.

"U.S. Appl. No. 14/051,750, Notice of Allowance mailed Feb. 13, 2014", 11 pgs.

"U.S. Appl. No. 14/051,750, Response filed Jan. 14, 2015 to Non Final Office Action mailed Oct. 15, 2014", 10 pgs.

Baru, Chaitanya, et al., "Xviews: XML Views of Relational Schemas", Proceedings of the Workshop on Databases and Expert System Application, 99, Florence, Italy, (1999), 1-6.

"U.S. Appl. No. 14/739,098, Preliminary Amendment filed Jun. 19, 2015", 8 pgs.

API AND BUSINESS LANGUAGE SCHEMA DESIGN FRAMEWORK FOR MESSAGE EXCHANGES

RELATED APPLICATIONS

This application is a continuation of U.S. application Ser. No. 12/984,461, filed Jan. 4, 2011, issued Jan. 8, 2013 as U.S. Pat. No. 8,352,968, which application is a continuation of U.S. application Ser. No. 12/771,981, filed Apr. 30, 2010, issued Feb. 8, 2011 as U.S. Pat. No. 7,886,305, which is a continuation of U.S. application Ser. No. 10/997,767, filed Nov. 24, 2004, issued Oct. 19, 2010 as U.S. Pat. No. 7,818,759, which claims the priority benefit of the filing date of U.S. Provisional Application No. 60/524,782, filed Nov. 24, 2003, which are incorporated herein, in their entirety, by reference.

COMPUTER LISTING

A computer listing is attached as an Appendix.

FIELD OF THE INVENTION

The present application relates generally to the technical field of application program interfaces (APIs) and language schemas.

BACKGROUND

Buyers, sellers, and other business partners, are increasingly utilizing electronic trading systems (e.g., electronic marketplaces) to collaborate and to do business with each other. Part of this collaboration may involve, for example, linking operational business processes. Business processes may be linked by the exchange of information, in agreed sequences and within agreed timeframes, between buyer and seller applications, and affiliated third party business service providers.

To facilitate the above-mentioned exchange of business information, buyer and seller applications, as well as applications of third party business service providers, may expose Application Program Interfaces (APIs) which allow applications to make calls (e.g., function calls) to other applications to either request or send information. However, as the number of buyers, sellers, and third party applications participating in the exchange of business information increases, the technical challenge of enabling this multitude of applications to exchange information increases. For example, the development of applications that are able to access APIs of a large number of other applications becomes increasingly burdensome and technically challenging.

SUMMARY OF THE INVENTION

According one aspect of the present invention, there is provided a server system to facilitate an exchange of messages with a remote client application. The server system includes a plurality of application servers hosting a plurality of applications. A plurality of Application Program Interfaces (APIs) provides programmatic access to the plurality of applications, each of the APIs being configured to receive request messages compiled by the remote client application. First and second request messages, respectively addressed to first and second APIs of the plurality of APIs, each comprise at least one common data component. Further, the first request message includes a first payload specific to the first API, and the second request message includes a payload specific to the second API.

DETAILED DESCRIPTION

Figure 1:
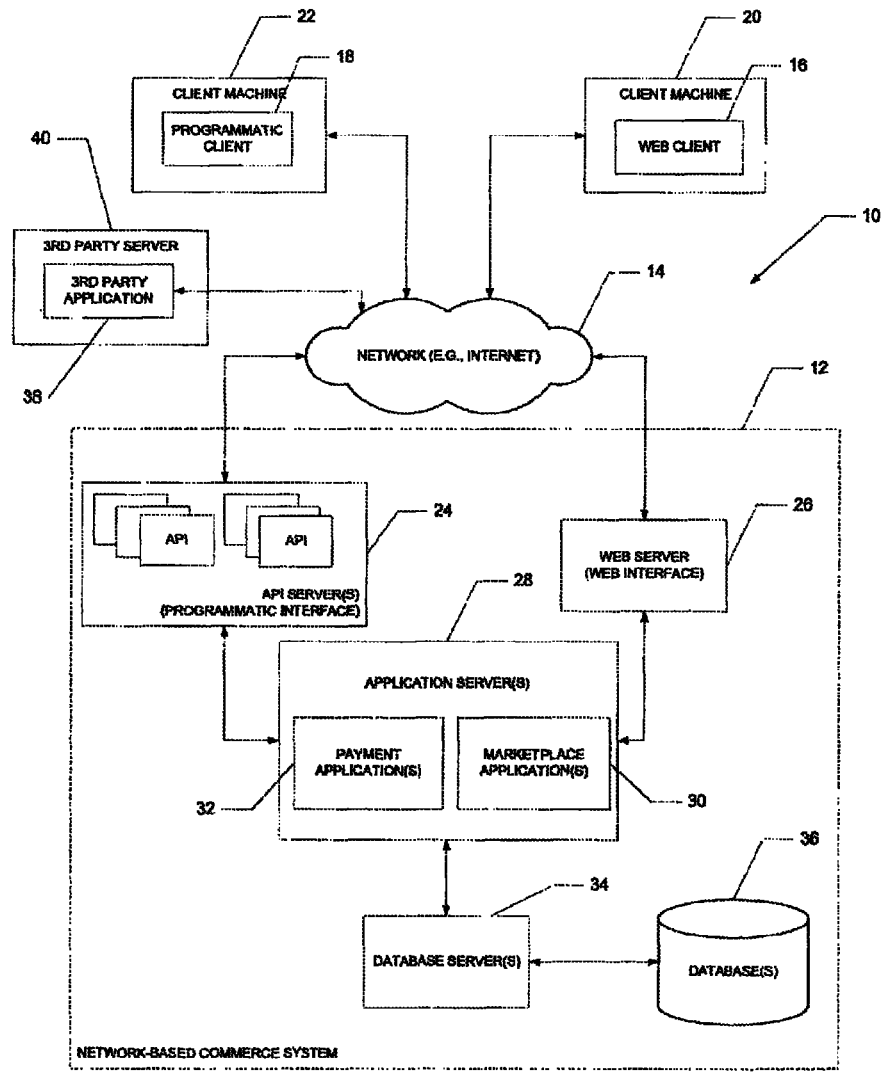
FIG. 1 is a network diagram depicting a trading system, within which an exemplary embodiment of the present invention may be deployed, having a client-server architecture.

A business language schema design framework for message exchanges in a trading system is described. In the following description, for purposes of explanation, numerous specific details are set forth in order to provide a thorough understanding of the present invention, wilt be evident, however, to one skilled in the art that the present invention may be practiced without these specific details.

An exemplary embodiment of the present invention is discussed below within the context of a network-based commerce system that supports a network-based, electronic marketplace. Buyers and sellers, utilizing buyer and seller applications, as well as third party business service providers, interact utilizing the electronic marketplace as a forum. Business processes may be driven by a wider range of electronic marketplace operational considerations, so as to enable buyers and sellers to conduct transactions utilizing the electronic marketplace. In one embodiment of the present invention, a buyer and seller communication model is proposed that identifies the requirements for message exchange sequences, message exchange timings, and the purpose of each message exchange.

In one embodiment, message exchanges comply with a business language schema component model. The business language schema design framework enables an electronic marketplace server system (e.g., the commerce system) to support a wide range of commerce transactions, including auction, fixed price buying and selling, product catalogs searches and payments. These transactions provide examples of communications between buying and selling applications via the electronic marketplace, as well as communications with other third party business service providers.

In an exemplary embodiment, there is provided a schema component model that provides an abstract definition of the business message payloads. Payloads may be defined in a way to support extensibility which enables other types of commerce transactions models to be made available via the marketplace (e.g., for electronic procurement, reverse auctioning, credit check, and shipment/logistic activities).

The business language schema catalogs common business message components that may be utilized for any number of business communications facilitated by an electronic marketplace (e.g., auction, fixed price buying and selling, product catalog search, catalog-based listings, and electronic payment in support of item purchases). The business language schema, in one embodiment, enables a wide range of business applications to interoperate with XML web services APIs, and externally located and internally hosted clients.

Request/response message payload components are defined by the business language schema which may be utilized to enable the building of a range of messages that may flow back and forth from buyers, sellers and third party business service providers to marketplace XML web services, these web services enabling trading parties to list, find, and sell items and services.

In various exemplary embodiments, message exchanges may be made, utilizing the business-language based message exchange model of an exemplary embodiment of the present invention, with both external and internal business applications over synchronous communication and asynchronous communication links. Further, document-oriented synchronous messaging, as well as document-oriented asynchronous messaging, may be supported. As will be described in further detail below, a message packaging format may be a flavor of the XML messaging format (e.g., SOAP 1.1, SOAP 1.2, ebXML, or an e-mail format such as MIME or any other arbitrary message packaging format). Further, transport protocols used may include HTTP, HTTPS, SMTP, or some other arbitrary transport protocol needed for particular business applications hosted remotely at a trading entity that requires moving data.

A schema design framework for a business language is accordingly provided, in an exemplary embodiment of the present invention, to support message payload definitions for a multitude of use cases and for use with a multitude of APIs. This may be accomplished via an extensibility model that includes base components, and business message components that support new transaction models and messaging components. Specifically, the base components provide a definition of basic core component types, basic components and aggregate components, including an abstract messaging framework. The business message components are based on the business information requirements for a particular use case.

Regarding the business messaging components, based on the business information requirements of a particular use case, the definitions of the basic set of messaging components are needed for a legacy transaction model can be supported utilizing the above mentioned base components in support of business message components. In one exemplary embodiment, the business language components for use in an electronic trading environment, such as that described below with respect to FIG. 1, may include: item, item transaction, shipping details, payment, address, user, buyer, seller and transaction components.

It will be appreciated that, over the course of time, many new types of business processes may be employed by a trading community (e.g., buyers, setters and third party service providers) that utilize an electronic marketplace and accordingly that interface with services exposed by the electronic marketplace. Such new types of applications may exploit different types of transaction interfaces (e.g. APIs) exposed by an electronic marketplace. An exemplary embodiment of the present invention enables the reusability of certain components, both at a messaging and an application level, while providing for the extensibility to accommodate such new types of business processes and applications. Accordingly, an exemplary embodiment of the present invention proposes an abstract message payload framework that can be extended for many different types of messages and over different protocols, as may be required.

Accordingly, in one embodiment, the business language schema design framework of the present invention may be utilized to achieve reusability, layering, extensibility, as well as ease of use and interoperability between a number of business processes and applications.

Further, the exemplary business language schema design framework seeks to avoid XML Schema Definition (XSD) features that present interoperability issues (e.g., WSDL and SOAP) in processes deployed on client application runtimes. Further, the exemplary framework seeks to take advantage of a wide a range of client run-time environments and development tools (e.g., ranging from public domain to commercially available software), and to decrease the cost of maintenance to clients to easily interpret messages by exploiting underlying reusable base and aggregate business components as well as extensibility features. An embodiment of the present invention also seeks to import, extend and or restrict schemas for a wide range of "enumerated" code types (e.g., ISO, currency and country codes) to use name spaces that enable modularity of business message components and corresponding XML web services APIs that consume and produce the resulting messages, and to satisfy the customization and extensibility needs of widely differing trading communities and transaction models. For example, the business language schema design framework seeks to be reusable in consumer-to-consumer (C2C), business-to-consumer (B2C), and business-to-business (B2B) trading communities.

In order to facilitate a framework for standardizing business information semantics in a flexible and yet interoperable manner, according to one embodiment, there may be provided application-specific message payload components that link back to a common set of core data components from which they are derived. Below are described core component concepts.

Business Language Schema Component Concepts

Core Component Type (CCT): a core component type is, in one embodiment, a low level construct that may have no meaning on its own. A core component type has a content component and additional components (e.g., mandatory or optional) which give it a specific meaning. An example of a core component type is an "amount", where the content part is a number (e.g., 87) and another required part is a unit (e.g., a Euro).

Basic core components: a basic core component represents, in the exemplary embodiment, a core business concept (e.g., a unique business semantic definition). This may be accomplished by employing a core component type (CCT) or a primitive data type (e.g., XSD data types) to which some other semantically unique object (e.g., a "weight" element is an instance of the core component type CCT Measure Type).

Aggregate core components: aggregate core components, in one exemplary embodiment, encapsulate two or more basic core components which represent higher-level business concepts (e.g., "shipping address" is an instance of Address Type). Each aggregate core component may have its own business semantic definition.

Having above provided a high level introduction, a more detailed description of an exemplary trading system, centered around a network-based commerce system, will now be described with reference to FIGS. 1-3.

Platform Architecture

FIG. 1 is a network diagram depicting a trading environment 10, according to one exemplary embodiment of the present invention, having a client-server architecture. A commerce server system, in the exemplary form of a network-based commerce system 12, provides server-side functionality, via a network 14 (e.g., the Internet) to one or more clients. FIG. 1 illustrates, for example, a web client 16 (e.g., a browser, such as the Internet Explorer browser developed by Microsoft Corporation of Redmond, Wash. State), and a programmatic client 18 executing on respective client machines 20 and 22.

Turning specifically to the network-based commerce system 12, an Application Program interface (API) server 24 and a web server 26 are coupled to, and provide programmatic and web interfaces respectively to, one or more application servers 28. Specifically, the API server 24 exposes multiple APIs to users of the commerce system 12. Each of these APIs supports one or more function calls to applications of the system 12.

The application servers 28 host one or more marketplace applications 30 and payment applications 32. The application servers 28 are, in turn, shown to be coupled to one or more databases servers 34 that facilitate access to one or more databases 36.

The marketplace applications 30 provide a number of marketplace functions and services to users that access the commerce system 12. The payment applications 32 likewise provide a number of payment services and functions to users. The payment applications 30 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 1 to both form part of the network-based commerce system 12, it will be appreciated that, in alternative embodiments of the present invention, the payment applications 32 may form part of a payment service that is separate and distinct from the commerce system 12.

Further, white the system 10 shown in FIG. 1 employs a client-server architecture, the present invention is of course not limited to such an architecture, and could equally well find application in a distributed, or peer-to-peer, system. The various marketplace and payment applications 30 and 32 could also be implemented as standalone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings on the commerce system 12 in an off-line manner, and to perform batch-mode communications between the programmatic client 18 and the network-based commerce system 12.

FIG. 1 also illustrates a third party application 38, executing on a third party server machine 40, as having programmatic access to the network-based commerce system 12 via the programmatic interfaces provided by the API server 24. For example, the third party application 38 may, utilizing information retrieved from the network-based commerce system 12, support one or more features or functions on a website hosted by the third party. The third party website may, for example, provide one or more promotional, marketplace or payment functions that are supported by the relevant applications of the network-based commerce system 12.

Marketplace Applications

Figure 2:
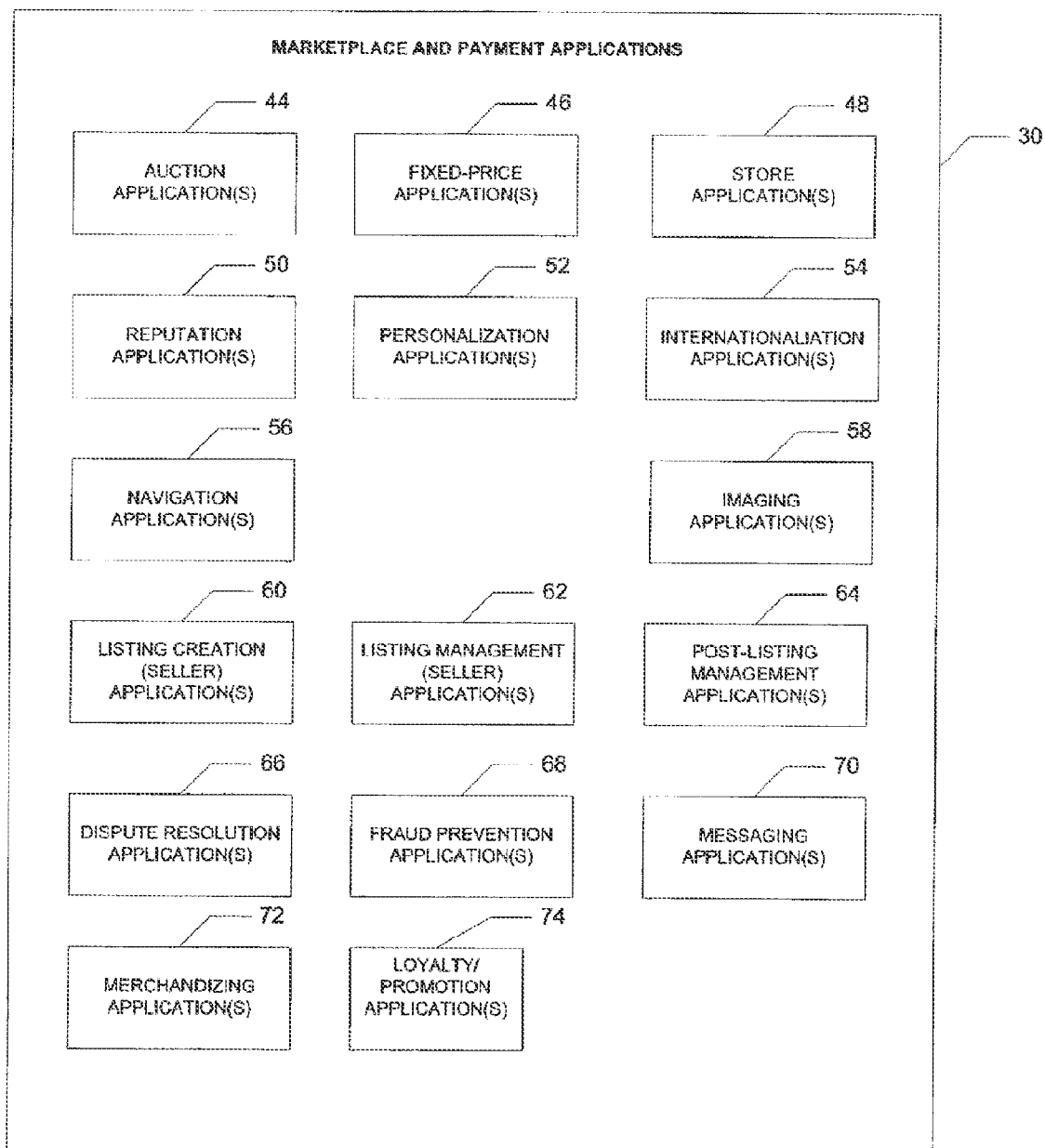
FIG. 2 is a block diagram illustrating multiple marketplace and payment applications that, in one exemplary embodiment of the present invention, form part of a commerce server system.

FIG. 2 is a block diagram illustrating multiple marketplace and payment applications 30 that, in one exemplary embodiment of the present invention, are provided as part of the network-based commerce system 12. The commerce system 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based commerce system 12 to establish, build and maintain reputations, which may be made available and published to potential trading partners. Consider that where, for example, the network-based commerce system 12 supports person-to-person trading, users may have no history or other reference information whereby the trustworthiness and credibility of potential trading partners may be assessed.

The reputation applications 50 allow a user, for example through feedback provided by other transaction partners, to establish a reputation within the network-based commerce system 12 over time. Other potential trading partners may then reference such a reputation for the purposes of assessing credibility and trustworthiness.

Personalization applications 52 allow users of the commerce system 12 to personalize various aspects of their interactions with the commerce system 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the commerce system 12 and other parties.

In one embodiment, the network-based commerce system 12 may support a number of marketplaces that are customized, for example, for specific geographic regions. A version of the commerce system 12 may be customized for the United Kingdom, whereas another version of the commerce system 12 may be customized for the United States. Each of these versions may operate as an independent marketplace, or may be customized (or internationalized) presentations of a common underlying marketplace.

Navigation of the network based-commerce system 12 may be facilitated by one or more navigation applications 56. For example, a search application enables key word searches of listings published via the commerce system 12. A browse application allows users to browse various category, catalogue, or inventory data structures according to which listings may be classified within the commerce system 12. Various other navigation applications may be provided to supplement the search and browsing applications.

In order to make listings, available via the network-based commerce system 12, as visually informing and attractive as possible, the marketplace applications 30 may include one or more imaging applications 58 utilizing which users may upload images for inclusion within listings. An imaging application 58 also operates to incorporate images within viewed listings. The imaging applications 58 may also support one or more promotional features, such as image galleries that are presented to potential buyers. For example, sellers may pay an additional fee to have an image included within a gallery of images for promoted items.

Listing creation applications 60 allow setters conveniently to author listings pertaining to goods or services that they wish to transact via the commerce system 12, and listing management applications 62 allow sellers to manage such listings. Specifically, where a particular seller has authored and/or published a large number of listings, the management of such listings may present a challenge. The listing management applications 62 provide a number of features (e.g., auto-relisting, inventory level monitors, etc.) to assist the seller in managing such listings. One or more post-listing management applications 64 also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50.

Dispute resolution applications 66 provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 68 implement various fraud detection and prevention mechanisms to reduce the occurrence of fraud within the commerce system 12.

Messaging applications 70 are responsible for the generation and delivery of messages to users of the network-based commerce system 12, such messages for example advising users regarding the status of listings at the commerce system 12 (e.g., providing "outbid" notices to bidders during an auction process or to provide promotional and merchandising information to users).

Merchandising applications 72 support various merchandising functions that are made available to sellers to enable sellers to increase sales via the commerce system 12. The merchandising applications 80 also operate the various merchandising features that may be invoked by sellers, and may monitor and track the success of merchandising strategies employed by sellers.

The network-based commerce system 12 itself, or one or more parties that transact via the commerce system 12, may operate loyalty programs that are supported by one or more loyalty/promotions applications 74. For example, a buyer may earn loyalty or promotions points for each transaction established and/or concluded with a particular seller, and be offered a reward for which accumulated loyalty points can be redeemed.

Data Structures

Figure 3:
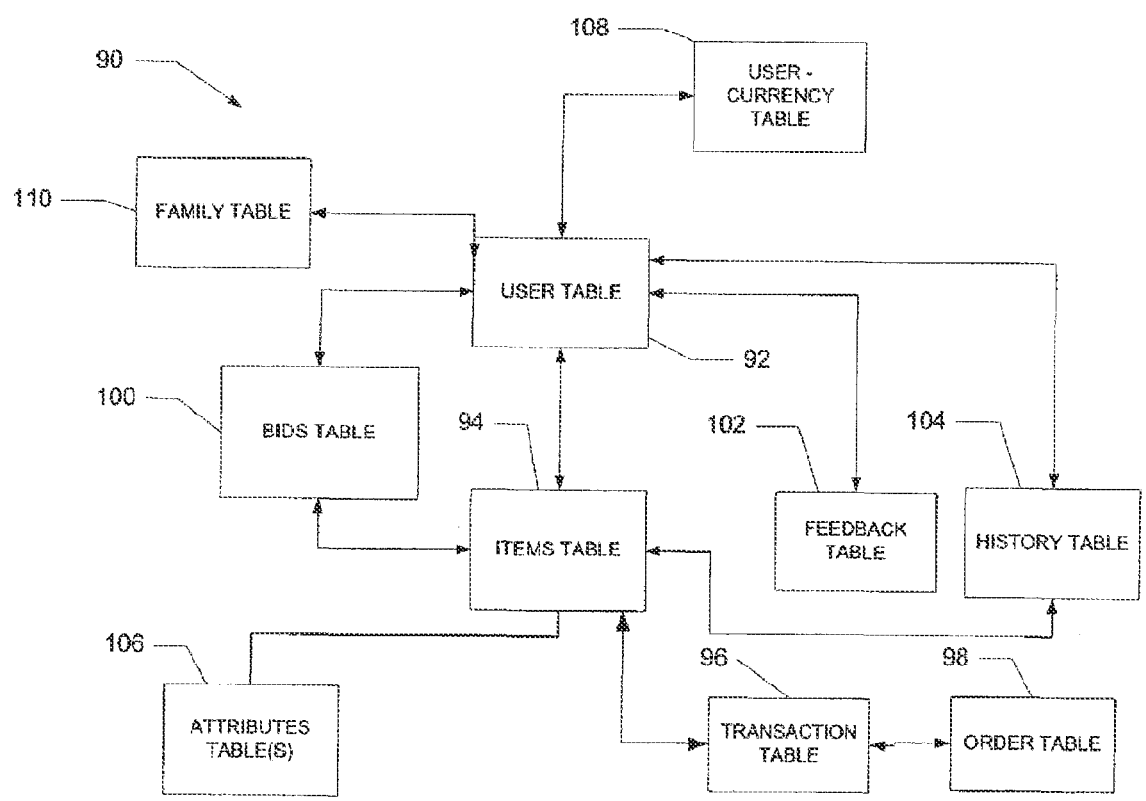
FIG. 3 is a high-level entity-relationship diagram illustrating various tables that may be maintained within databases utilized by the marketplace and payment applications described with reference to FIG. 2.

FIG. 3 is a high-level entity-relationship diagram, illustrating various tables 90 that may be maintained within the databases 36, and that are utilized by and support the marketplace and payment applications 30 and 32. A user table 92 contains a record for each registered user of the network-based commerce system 12, and may include identifier, address and financial instrument information pertaining to each such registered user. A user may, it will be appreciated, operate as a setter, a buyer, or both, within the network-based commerce system 12. In one exemplary embodiment of the present invention, a buyer may be a user that has accumulated value (e.g., commercial or proprietary currency), and is then able to exchange the accumulated value for items that are offered for sale by the network-based commerce system 12.

The tables 90 a so include an items table 94 in which are maintained item records for goods and services that are available to be, or have been, transacted via the commerce system 12. Each item record within the items table 94 may furthermore be linked to one or more user records within the user table 92, so as to associate a seller and one or more actual or potential buyers with each item record.

A transaction table 96 contains a record for each transaction (e.g., a purchase transaction) pertaining to items for which records exist within the items table 94.

An order table 98 is populated with order records, each order record being associated with an order. Each order, in turn, may be with respect to one or more transactions for which records exist within the transactions table 96.

Bid records within a bids table 100 each relate to a bid received at the network-based commerce system 12 in connection with an auction-format listing supported by an auction application 44. A feedback table 102 is utilized by one or more reputation applications 50, in one exemplary embodiment, to construct and maintain reputation information concerning users. A history table 104 maintains a history of transactions to which a user has been a party. One or more attributes tables 106 record attribute information pertaining to items for which records exist within the items table 94. Considering only a single example of such an attribute, the attributes tables 106 may indicate a currency attribute associated with a particular item, the currency attribute identifying the currency of a price for the relevant item as specified in by a seller.

Figure 4:
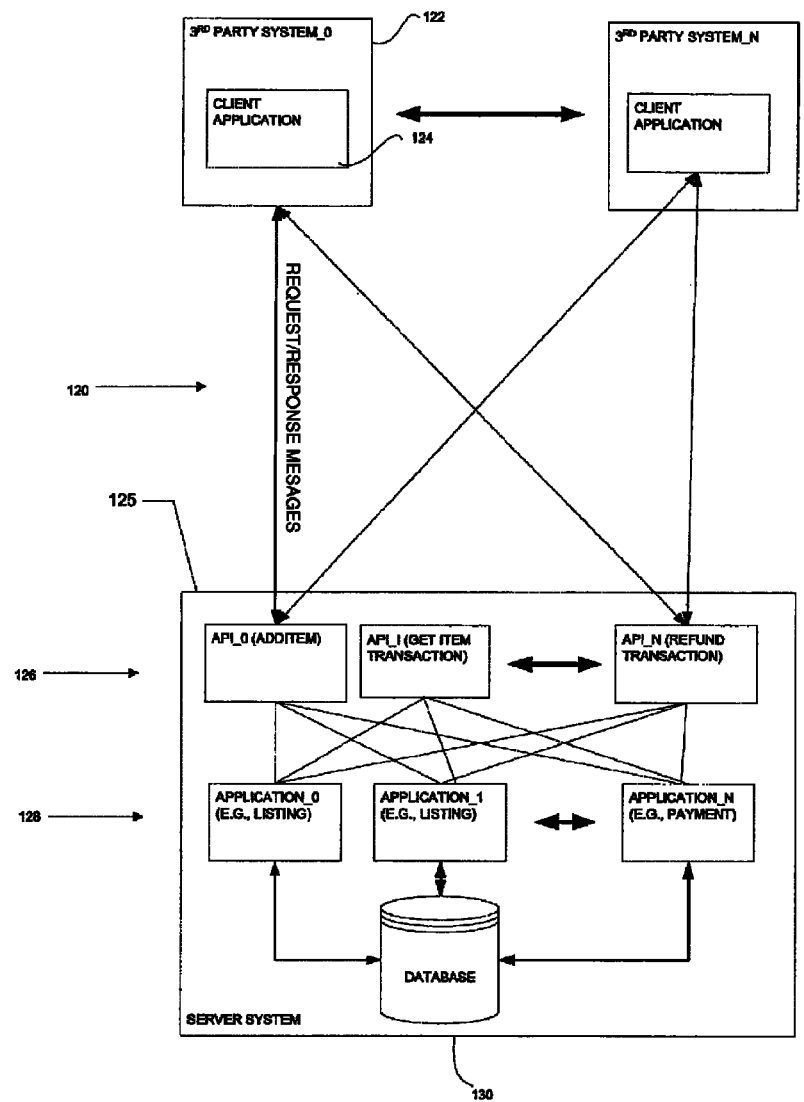
FIG. 4 is a block diagram illustrating further details regarding an exemplary trading system, configured according to one of embodiment of the present invention.

Having above described an exemplary trading environment 10, within which an exemplary embodiment of the present invention maybe deployed, further details regarding a business language schema design framework, according to an exemplary embodiment of the present invention, for message exchanges (e.g., within the trading environment 10) are now described. FIG. 4 is block diagram illustrating a client-server architecture that may be deployed, for example, as part of the trading environment 10 described above with reference to FIG. 1. Referring specifically to FIG. 4, abstract request/response messages 120 are sent between one of N third party systems, such as third party system 122, and a server system 125 that is accessed is a number of APIs exposed by respective API servers 24

Thus, in broad terms, the third party system 122, using the client application 124, compiles a request message, which is directed to an API 126 (e.g., AddItem, GetItemTransaction, etc.) of the server system 125. Each ARI 126 in turn provides access through supported function calls to one of a plurality of applications, indicated generally by arrow 128, that have access to a database 130.

Figure 5:
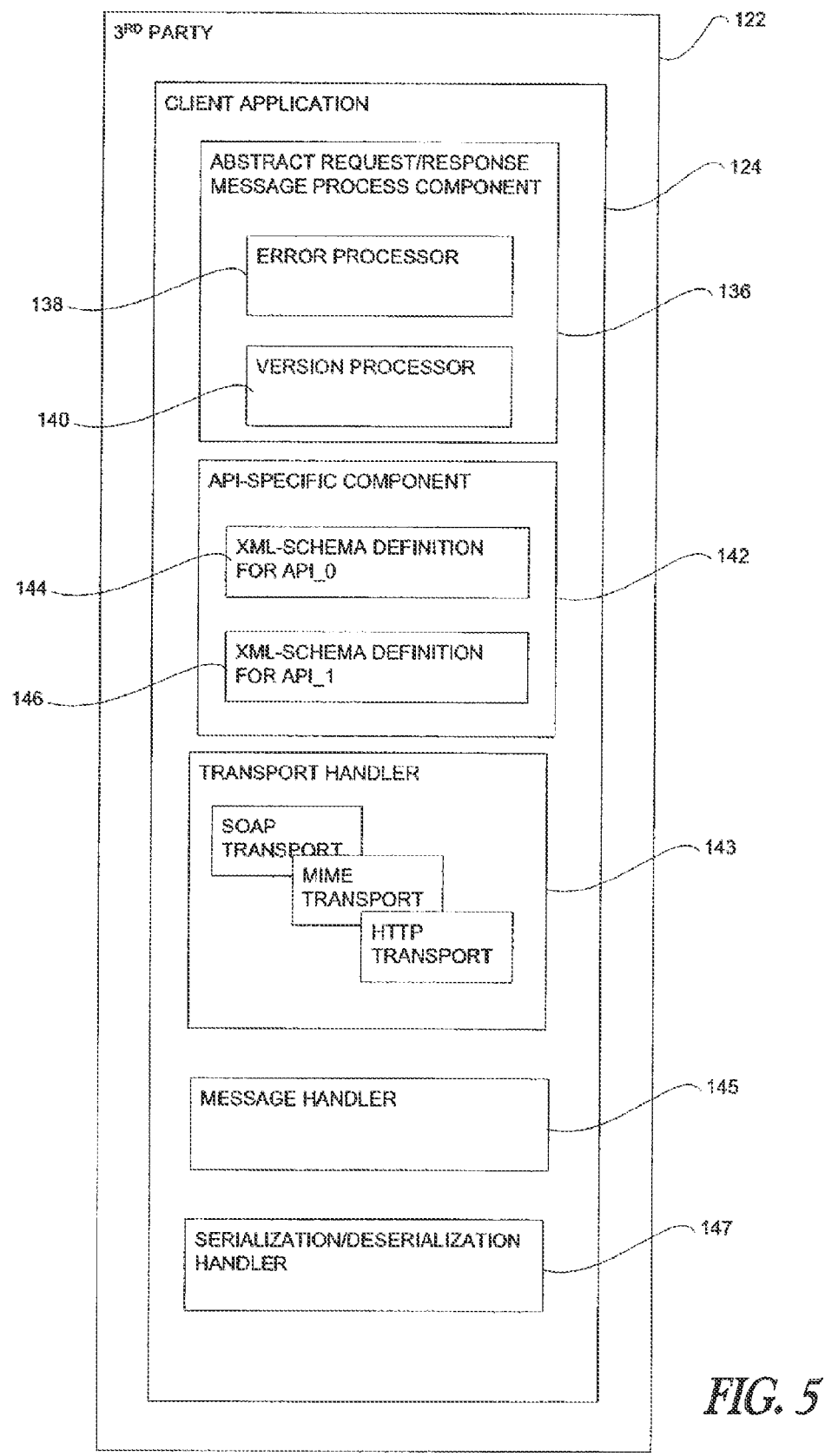
FIG. 5 is a block diagram illustrating the architecture of an exemplary third party application, configured according to one embodiment of the present invention, to communicate with a commerce server system that exposes a number of APIs.

Turning now to FIG. 5, flirt her details regarding the exemplary client application 124, hosted on a third party system 122, are shown. The client application 124 includes an abstract request/response message process component 136 for processing the request/response messages 120 shown in FIG. 4. In particular, the abstract request/response message process component 136 comprises an Error Processor 138 and a Version Processor 140. The client application 134 further comprises an API-specific component 142 that includes XML schema definitions 144, 146 for the various API's 126 with which the client application 124 is configured to communicate (e.g., API_0 and API_1 shown in FIG. 4). A number of possible front end transport technologies, such as SOAP, MIME and HTTP, are shown to be supported by a transport handler 13.

The client application 124 also includes a message handler 145, and a serialization/deserialization handler 147, in addition to the API specific component 142. Specifically, each third party system 122 may host a client application 124, which can exploit the abstract request/response message via any one of the following processing components:

i) A transport handler 143 which supports the communication protocol e.g., HTTP, HTTPS, SMTP, etc;
ii) A message handler 145 which supports the message envelope processing capabilities. e.g., HTTP, POST Raw Data stream, SOAP, MIME, etc.;
iii) Abstract request serialization and response deserialization handler 147; and
iv) Client-side API specific application components 142.

The transport handler 143 and the message handler can be formed from any standard, commercially available Software Development Kit (SDK) to which a third party has access in its development and runtime deployment environments.

The abstract request serialization and response deserialization handler 147 can be developed for client applications 124 once, and reused multiple times, thus reducing the cost of interfacing and also providing consistent interfacing with API-based application services exposed by the commerce system 12 over a wide range of transport and messaging particles. Such a "write once and, use multiple times" deployment is useful for trading communities, regardless of use case and other infrastructure components in support of transport, security and messaging protocols.

Figure 6:
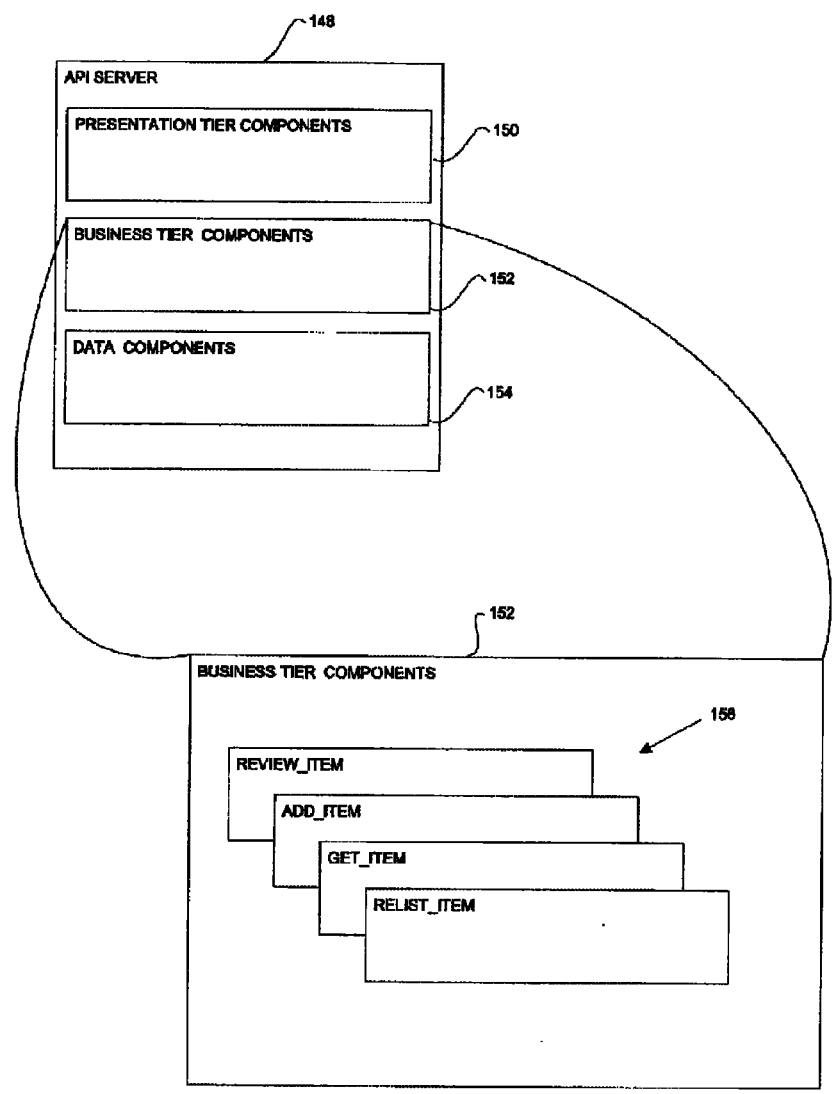
FIG. 6 is a block diagram illustrating the architecture of an API server, according to an exemplary embodiment of the present invention.
Figure 7:
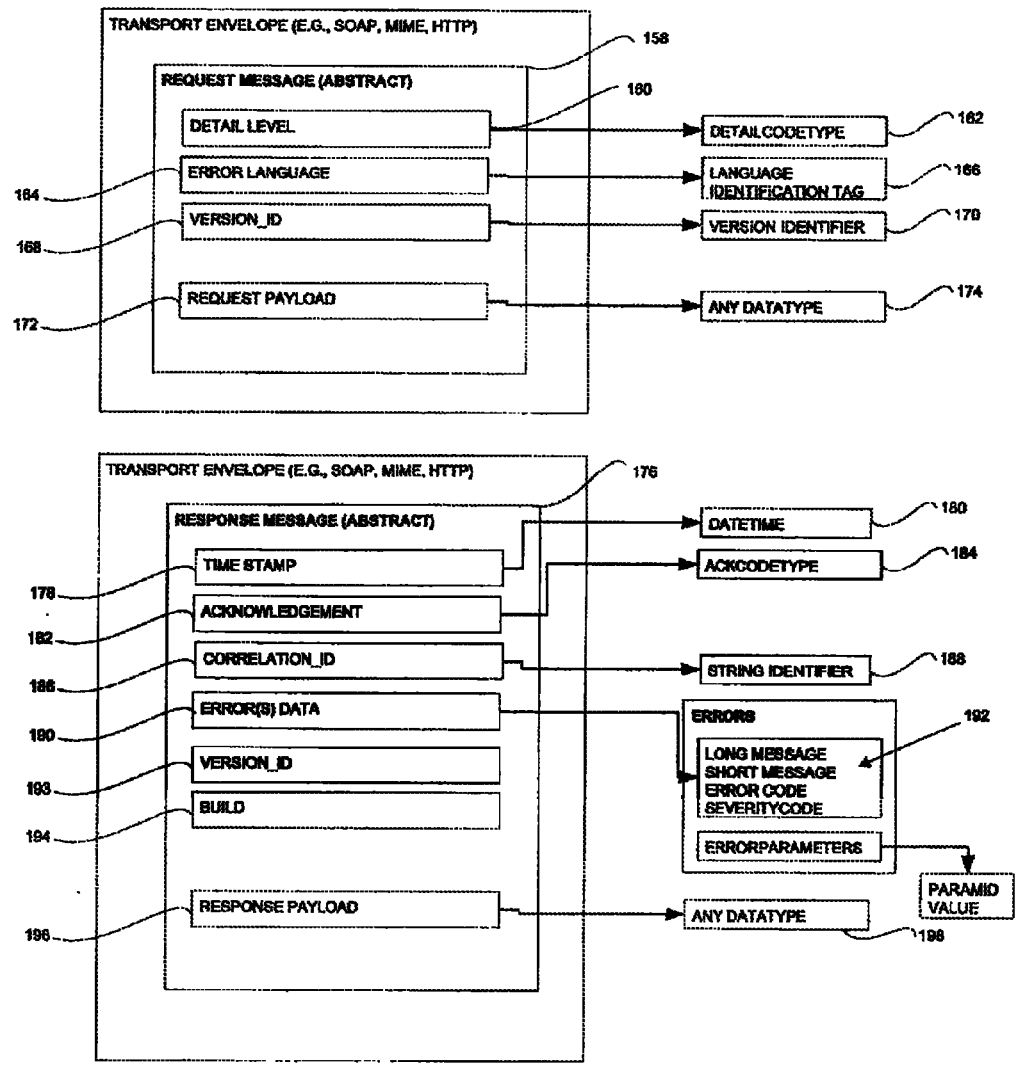
FIG. 7 is a block diagram illustrating structural details of exemplary abstract request and response messages.

Turning now to FIG. 6, at the server side, an exemplary API Server 148 comprises a front end Presentation tier 150, which receives request messages and sends response messages, a Business tier 152 and a Data components tier 154. The Business tier 152 includes components corresponding to the various APIs, indicated generally by arrow 156. The benefits on the server side in terms of creating response payloads is that, as for request payloads, basic response components are compilable using reusable components The structure of exemplary abstract request and response messages 158, 176 will now be described in detail with reference to FIG. 7. Referring first to the abstract request message 158, an exemplary abstract request message 158 comprises a Detail Level component 160 and an associated DetailCodeType 162. This advantageously allows the client application 124 to request a required level of detail within a listing, for example, relating to a particular item listed on the commerce system 12. The level of detail requested may range from a most detailed to a least detailed level. The abstract request message 158 further comprises an Error Language component 164 and an associated Language Identification Tag 166, and a Version_ID component 168 and an associated Version Identifier 170. The abstract request message 158 is then completed by providing a Request Payload component 172, for carrying any type of XML data 174.

An exemplary abstract response message 176 includes a Time Stamp component 178 and an associated DateTime 180, and an Acknowledgement component 182 and an associated AckCodeType 184. These components are used to acknowledge receipt of a request message of the received from a client application 124.

The abstract response message 176 further includes a Correlation_ID component 186 and associated String Identifier 188, an Error(s) Data component 190 and associated data 192, a Version_ID 193, a Build component 194 and a Response Payload component 196 for receiving any type of XML data 198.

The Correlation_ID component 186 and associated String Identifier 188 allow the abstract response message 176 to be correlated with a particular incoming request message 158, and to indicate this correlation to the requesting client application 124.

Thus, there is some commonality in the abstract request and abstract response messages 158 and 176, namely they both can carry any type of data, and both include version information.

The Error Language component 164 and the Error Data(s) component 190 ensure that the API request/response messages consistently use, manage and communicate error components. Part of this is the ability to communicate versioning information identifying what version of an API a particular API server 24 is using to communicate with a client application 124 of a third party system 122 (e.g., a client 20 and 22). Thus, for example, if a third party system 122 sends a request message that includes incorrect data or that does not comply with the published requirements of a target API, the Error Data(s) component 190 is used by the target API to communicate information regarding the error back to the client application 124. Thus, when an error is detected, a response message is generated by the relevant API, this response message being either a long message or a short message, and including an error code and associated severity code. This response message is sent to the relevant client application 124, thereby informing the client application 124 as to the nature of the error.

Regarding the version of the API that the API server 24 is using, versioning information is included in both a request message from a client application 124 to the API server 24, as well as a response message from the API server 24 back to the client application 124. This is indicated schematically by blocks 168 and 193 in FIG. 7. Thus, the respective version components in the request and response messages indicate a particular version of the API on the API server 24. In so doing, and in view of the fact that the API version used by the API server 24 typically changes, the client application 124 will have a way of detecting when it needs to upgrade the schema that it uses to format and generate request messages to the relevant.

An embodiment of the present invention facilitates extension of the behavior of the APIs in terms of the request and response message structures. In other words, the abstract request and response models can be extended to enable API requests and responses between a third party system 122 and any number of APIs provided by one or more API servers 24. For example, a particular server system may expose a number of APIs, each conforming to the basic request/response messages described above. Thus, for example, the basic request/response messages can be extended to enable an AddItem API, or a GetItem API, or a GetAccount API. Thus, for example, for a third party system wishing to exchange item information with the commerce system 12, the basic abstract request message may be extended with the addition of information conforming to a schema understood by a GetItem API.

In other words, this arrangement allows a third party system 122, hosting an appropriately configured client application 124, to communicate with multiple APIs with a degree of uniformity and predictability. In one embodiment, a uniform data processing model is utilized and supported by a number of APIs, thereby allowing developers of client applications to reuse parts of their code.

The abstract request and response data processing component 136 of a client application 124 allows a client application developer to create and modify a client application 124 to communicate with multiple APIs using a common portion of code. The abstract request and response data processing framework can be reused by a client application 124 for a number of APIs exposed by the commerce system 12, for example.

Dealing more specifically with the re-usability of the business language schema data components, in a specific exemplary deployment environment of a trading environment 10 such as that illustrated in FIG. 1, schema components may be defined such that they can be reused for multiple cases of purchasing and selling items listed via the network-based commerce system 12. Examples of such reuse are provided below:

1) Listing an item utilizing an AddItem API: a client application 124 may be configured to list an item to be sold in specific regions of the world, and to recognize acceptable payment and shipment options for purchasing and shipping items in such a specific region.
2) Revising and relisting an item utilizing ReviseItem and RelistItem APIs: a client application 124 may be configured to enable the revision and relisting of existing items, such that the item properties are revised or a completely new listing for the item is created, should the item not previously have been sold.
3) Getting information about an item utilizing GetItem, GetSellerList, or GetBidderList APIs: a client application 124 may be configured to retrieve information about a particular item, or multiple items, that are actively listed via the network-based commerce system 12, In all of the above use cases, the client application 124 is required to send information back to a network-based commerce system 112 regarding items listed for sale via the commerce system 12. This may require description of an <item> structure in a consistent manner such that the client applications 122 from which the API calls originate understand the semantics of an item listed by a seller on the e-commerce system 12. However, since the context of each call from a client application 124 is different in each use case scenario, a different degree of information needs to be provided such that some data components are included or excluded.

Utilizing the item listing use case scenario described above, the issues described above can be addressed utilizing (1) an <item> data component model, and (2) multiple data validation levels.

Turning first to the <item> data component model, in terms of this model an "item" has required optional data components. These components internally also have child components that are required and optional components.

Accordingly, a single item component definition may be used for multiple API use cases, with the developers and designers of the APIs being able to select which elements of the item component must be present and which elements of an item component do not need to be present.

Turning now to the multiple data validation levels, when a client application 124 sends an API request message payload 172, an API processing payload may, in one embodiment, include the following sequence of validations:

(a) Schema Level Data Validation: the API request message payload 172 is validated with respect to an underlying schema specific to the API message payload (e.g., utilizing the XML schema definition for the item data component).
(b) API Specific Syntactic Data validation: This involves additional data-level validation to ensure that the client application 124 has sent required data elements that are specified in the XML schema definition to the option elements, but that are defined as required elements by the relevant API.
(c) Business Application Data Validation: This validation involves checking for a wide range of business application level validations.

The above sequence of validations, it will be noted, utilizes a single definition of key business data components such that data variability in request/response messages can be supported in a controlled manner using the required validation logic for the business use case. For example, for the following the three exemplary APIs (GetItem, GetItem Transaction and SellerList), the same definition of an <item> business definition component can be used on the client side yet the APIs will return response messages with varying API data structures. This enables uniformity in a semantic definition, yet allows the return of different views of the <item> business component according to use case. Examples of response are provided in the attached Computer Program Listing Appendix.

Accordingly, a server system (e.g., a network-based commerce system 12) that exposes multiple business application services can utilize these multiple exposed business applications in communicating with multiple client applications 122 in a way that the client applications 122 can understand and communicate. For example, information about an item with varying syntactic characteristics that correspond to an item is communicated (e.g., information about an item with varying syntactic characteristics that correspond to a data item component with a common semantic definition). The above contributes to the reusability of data components within, for example, a trading community with multiple use cases.

To develop a client application 124 that communicates with multiple APIs, or to modify an existing client application 124 to talk to multiple APIs, a developer downloads or imports XML schema definitions for each of the multiple APIs. For example, for an exemplary GetTransactionDetail API, the developer will need to import or download the corresponding schema for this API, and in particular the GetTransactionDetail request message as well as the GetTransactionDetail response message. Thereafter, the client application 124 will need to integrate these schema processing components with their own (e.g., as part of the API specific component 142).

The above-described business language schema design framework is able to cater for messages being compiled in different data formats, ranging from a raw ACP format, to SOAP, to MIME to HTTP. Thus, for example, the same message data format can be used to transfer a request payload 172 from a client application 124 to the server, yet with the response payload 196 being sent from the server to the client application 124 in a different message format. From the point of view of the client application 124, a common data processing mechanism may be utilized. In other words, the request payload 1172 and response payload 196 are transport and message data format independent.

Figure 8:
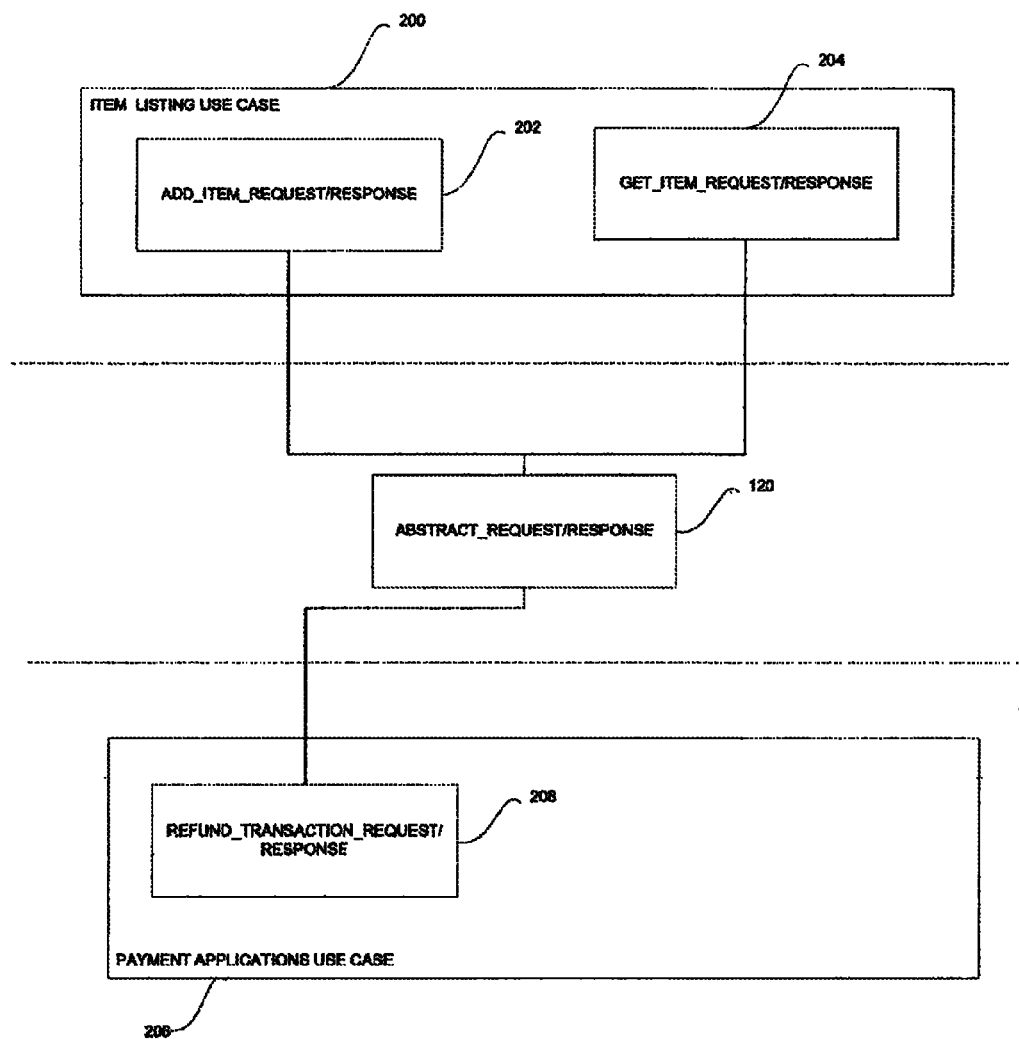
FIG. 8 is a block diagram illustrating that the structure of an abstract request-response message may be extended to a specific item listing and payment requests, in one exemplary embodiment of the present invention.

With reference to FIG. 8, in exemplary use case scenarios, the abstract request/response message 120 may be extended to an "item listing" use case 200 and a payment application use case 206. For the item listing use case 200, an abstract message 120 may be extended to be an Add_Item Request/Response message 202 or a Get_Item_Transaction Request/Response message 204. For the payment application use case 206, the abstract message 120 may be extended to be a Refund_Transaction Request/Response 208 or a Get_Item_Transaction Request/Response 210, merely for example.

An exemplary Get_Transaction Request message is listed below:

```
<GetItemTransactionsRequest xmlns:xsd="http://www.w3.org/2001/XMLSchema
xmlns="urn:marketplace:api:marketplaceAPI">
    <ErrorLanguage
xmlns="urn:marketplace:apis:BLBaseComponents">en_US</ErrorLanguage>
    <Version xmlns="urn:marketplace:apis:BLBaseComponents">383</Version>
    <EndUserIP
xmlns="urn:marketplace:apis:BLBaseComponents">10.254.45.68</EndUserIP>
    <ItemID
xmlns="urn:marketplace:apis:BLBaseComponents">4074744369</ItemID>
        <ModTimeFrom>2004-11-10T17:23:00.0664190-08:00</ModTimeFrom>
        <ModTimeTo>2004-11-15T17:23:00.0664190-08:00</ModTimeTo>
    </GetItemTransactionsRequest>
    <GetItemTransactionsResponse
xmlns:xsd="http://www.w3.org/2001/XMLSchema
xmlns="urn:marketplace:api:marketplaceAPI">
    <ns1:Timestamp
xmlns:ns1="urn:marketplace:apis:BLBaseComponents">2004-11-
16T01:23:06.453Z</ns1:Timestamp>
    <ns2:Ack
xmlns:ns2="urn:marketplace:apis:BLBaseComponents">Success</ns2:Ack>
    <ns3:CorrelationID
xmlns:ns3="urn:marketplace:apis:BLBaseComponents">00000000-00000000-
00000000-00000000-00000000-00000000-0000000000</ns3:CorrelationID>
    <ns4:Version
xmlns:ns4="urn:marketplace:apis:BLBaseComponents">383</ns4:Version>
    <ns5:Build
xmlns:ns5="urn:marketplace:apis:BLBaseComponents">20041112174350</ns5:
Build>
    <ns6:PaginationResult
xmlns:ns6="urn:marketplace:apis:BLBaseComponents">
        <ns6:TotalNumberOfPages>1</ns6:TotalNumberOfPages>
        <ns6:TotalNumberOfEntries>1</ns6:TotalNumberOfEntries>
    </ns6:PaginationResult>
    <HasMoreTransactions>false</HasMoreTransactions>
    <TransactionsPerPage>100</TransactionsPerPage>
    <PageNumber>1</PageNumber>
    <ReturnedTransactionCountActual>1</ReturnedTransactionCountActual>
    <ns7:Item xmlns:ns7="urn:marketplace:apis:BLBaseComponents">
        <ns7:AutoPay>false</ns7:AutoPay>
        <ns7:BuyerProtection>ItemIneligible</ns7:BuyerProtection>
        <ns7:Currency>USD</ns7:Currency>
        <ns7:ItemID>4074744369</ns7:ItemID>
        <ns7:ListingType>Chinese</ns7:ListingType>
        <ns7:PaymentMethods>PaymentSeeDescription</ns7:PaymentMethods>
        <ns7:PrivateListing>false</ns7:PrivateListing>
        <ns7:Quantity>1</ns7:Quantity>
        <ns7:Seller>
            <ns7:AboutMePage>false</ns7:AboutMePage>
<ns7:EIASToken>nY+sHZ2PrBmdj6wVnY+sEZ2PrA2dj6wJkoKpC5WCogqdj6x9n
Y+seQ==</ns7:EIASToken>
            <ns7:Email>silkauto_beekde5@ds9.cc</ns7:Email>
            <ns7:FeedbackScore>5</ns7:FeedbackScore>
            <ns7:FeedbackPrivate>true</ns7:FeedbackPrivate>
            <ns7:FeedbackRatingStar>None</ns7:FeedbackRatingStar>
```

```
            <ns7:IDVerified>true</ns7:IDVerified>
            <ns7:NewUser>false</ns7:NewUser>
            <ns7:RegistrationDate>1999-01-19T08:00:00.000Z</ns7:RegistrationDate>
            <ns7:Site>US</ns7:Site>
            <ns7:Status>Confirmed</ns7:Status>
            <ns7:UserID>beekde5</ns7:UserID>
            <ns7:UserIDChanged>false</ns7:UserIDChanged>
            <ns7:UserIDLastChanged>2001-01-19T17:13:05.000Z</ns7:UserIDLastChanged>
            <ns7:SellerInfo>
               <ns7:AllowPaymentEdit>true</ns7:AllowPaymentEdit>
               <ns7:CheckoutEnabled>false</ns7:CheckoutEnabled>
               <ns7:CIPBankAccountStored>false</ns7:CIPBankAccountStored>
               <ns7:GoodStanding>true</ns7:GoodStanding>
               <ns7:LiveAuctionAuthorized>false</ns7:LiveAuctionAuthorized>
               <ns7:MerchandizingPref>OptOut</ns7:MerchandizingPref>
               <ns7:QualifiesForB2BVAT>false</ns7:QualifiesForB2BVAT>
               <ns7:SellerLevel>None</ns7:SellerLevel>
               <ns7:StoreOwner>false</ns7:StoreOwner>
            </ns7:SellerInfo>
         </ns7:Seller>
         <ns7:SellingStatus>
            <ns7:ConvertedCurrentPrice currencyID="USD">10.0</ns7:ConvertedCurrentPrice>
            <ns7:CurrentPrice currencyID="USD">10.0</ns7:CurrentPrice>
            <ns7:QuantitySold>1</ns7:QuantitySold>
         </ns7:SellingStatus>
         <ns7:Site>US</ns7:Site>
         <ns7:Title>My ItemTitle</ns7:Title>
      </ns7:Item>
      <ns8:TransactionArray xmlns:ns8="urn:marketplace:apis:BLBaseComponents">
         <ns8:Transaction>
            <ns8:AmountPaid currencyID="USD">10.0</ns8:AmountPaid>
            <ns8:AdjustmentAmount currencyID="USD">0.0</ns8:AdjustmentAmount>
            <ns8:ConvertedAdjustmentAmount currencyID="USD">0.0</ns8:ConvertedAdjustmentAmount>
            <ns8:Buyer>
               <ns8:AboutMePage>false</ns8:AboutMePage>
               <ns8:EIASToken>nY+sHZ2PrBmdj6wVnY+sEZ2PrA2dj6wJkoKjAZKLpA+dj6x9nY+seQ==</ns8:EIASToken>
               <ns8:Email>silkauto_ny_buy@unicorn.qa.marketplace.com</ns8:Email>
               <ns8:FeedbackScore>0</ns8:FeedbackScore>
               <ns8:FeedbackRatingStar>None</ns8:FeedbackRatingStar>
               <ns8:IDVerified>false</ns8:IDVerified>
               <ns8:NewUser>false</ns8:NewUser>
               <ns8:RegistrationDate>2001-12-13T00:56:09.000Z</ns8:RegistrationDate>
               <ns8:Site>US</ns8:Site>
               <ns8:Status>Confirmed</ns8:Status>
               <ns8:UserID>ny_buy</ns8:UserID>
               <ns8:UserIDChanged>false</ns8:UserIDChanged>
               <ns8:UserIDLastChanged>2002-02-02T00:33:10.000Z</ns8:UserIDLastChanged>
               <ns8:BuyerInfo>
                  <ns8:ShippingAddress>
                     <ns8:Country>US</ns8:Country>
                     <ns8:PostalCode>12201</ns8:PostalCode>
                  </ns8:ShippingAddress>
               </ns8:BuyerInfo>
            </ns8:Buyer>
            <ns8:ShippingDetails>
               <ns8:AllowPaymentEdit>false</ns8:AllowPaymentEdit>
               <ns8:ChangePaymentInstructions>false</ns8:ChangePaymentInstructions>
               <ns8:InsuranceOption>NotOffered</ns8:InsuranceOption>
               <ns8:InsuranceWanted>false</ns8:InsuranceWanted>
               <ns8:SalesTax>
                  <ns8:SalesTaxPercent>0.0</ns8:SalesTaxPercent>
                  <ns8:ShippingIncludedInTax>false</ns8:ShippingIncludedInTax>
               </ns8:SalesTax>
            </ns8:ShippingDetails>
            <ns8:ConvertedAmountPaid currencyID="USD">10.0</ns8:ConvertedAmountPaid>
            <ns8:ConvertedTransactionPrice currencyID="USD">10.0</ns8:ConvertedTransactionPrice>
            <ns8:CreatedDate>2004-11-16T01:22:58.000Z</ns8:CreatedDate>
            <ns8:DepositType>None</ns8:DepositType>
            <ns8:QuantityPurchased>1</ns8:QuantityPurchased>
            <ns8:Status>
```

```
<ns8:marketplacePaymentStatus>NoPaymentFailure</ns8:marketplacePaymentStatus>
        <ns8:CheckoutStatus>CheckoutIncomplete</ns8:CheckoutStatus>
        <ns8:LastTimeModified>2004-11-
16T01:22:58.000Z</ns8:LastTimeModified>
        <ns8:PaymentMethodUsed>None</ns8:PaymentMethodUsed>
        <ns8:CompleteStatus>Incomplete</ns8:CompleteStatus>
      </ns8:Status>
      <ns8:TransactionID>0</ns8:TransactionID>
      <ns8:TransactionPrice currencyID="USD">10.0</ns8:TransactionPrice>
    </ns8:Transaction>
  </ns8:TransactionArray>
  <PayPalPreferred>false</PayPalPreferred>
</GetItemTransactionsResponse>
```

Figure 9:
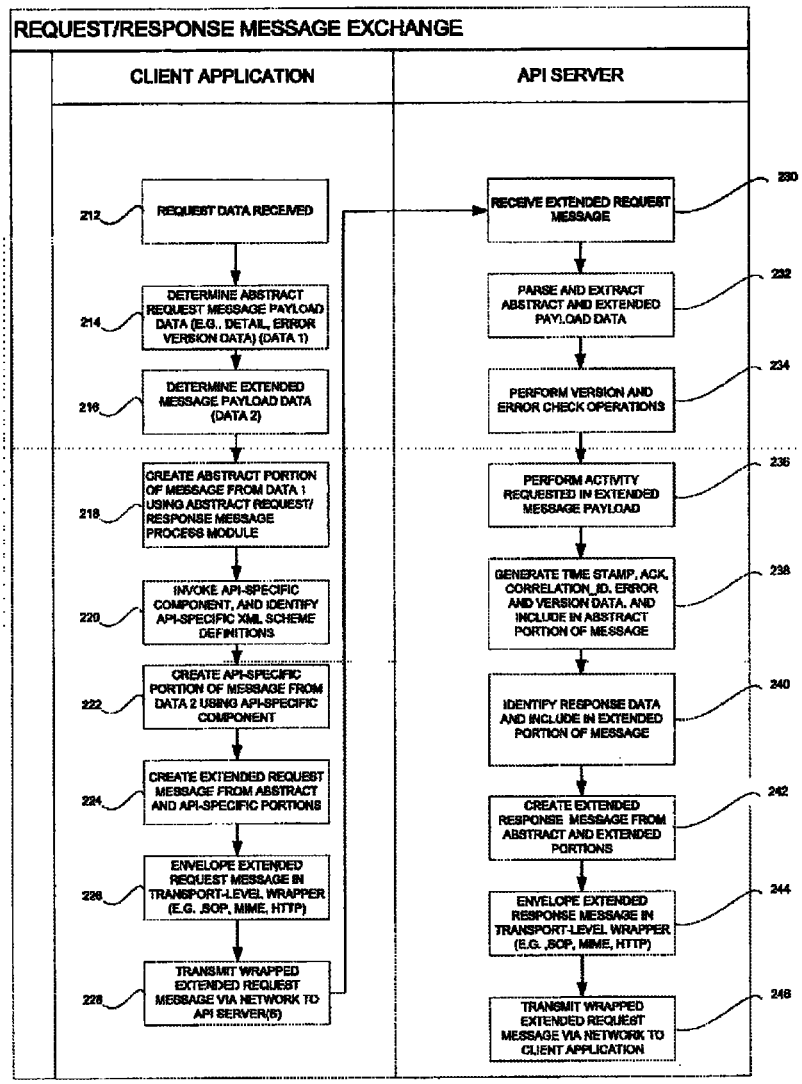
FIG. 9 is a flowchart illustrating a method, according to an exemplary embodiment of the present invention, to communicate messages between a client application and an API server of a plurality of API servers.

The request/response message exchange between the client application 124 and the API server will now be described with reference to FIG. 9. On the client application side of the message exchange, the operations involved in the content occasion 124 compiling a request message are as follows:

receiving data to being included in the request message, indicated by block 212;
determining the abstract request message payload data 1, comprising, for example, the required level of detail and the version of the XML schema definition for a specific API (e.g. API_0) being used by the client application 124, indicated by block 214;
determining the payload data 2, indicated by block 216;
creating the abstract portion of the message from data 1, indicated by block 218;
invoking an API-specific component and identifying the API-specific XML schema definitions, indicated by block 220;
creating the API-specific portion of the message from data 2, using the API-specific component, indicated by block 222;
creating an extended request message from the abstract and API-specific portions, indicated by block 224;
enveloping the extended request message in a transport level wrapper, indicated by block 226; and
transmitting the wrapped extended request message via a network to the API server, indicated by block 228.

At the API server, the operations involved in compiling a response message for the client application 124 can be summarized as follows:

receiving the client's extended request message, indicated by block 230;
extracting the abstract and extended payload data, indicated by block 232;
performing the required version and error check operations, indicated by block 234;
performing the activity requested in the extended message payload, indicated by block 236;
generating a time stamp, acknowledgement, correlation ID, error and version data, and including this data into the abstract portion of the response messages, indicated by block 238
identifying the appropriate response data and including this in the extended portion of the response message, indicated by block 240;
creating an extended response message from the abstract and extended portions, indicated by block 242;
enveloping the extended response message in a transport level wrapper, indicated by block 244; and
transmitting the wrapped extended response message via a network to the client application, indicated by block 246.

An embodiment of the present invention further utilizes enumerated code types. This feature is described with reference to an example, such as the ListingDuration code type. Enumerated code types can be used for information components that may have a fixed set of values. For example, ListingDuration code type identifies how long an item may be listed on the commerce system 12. There are typically three different values that ListingDuration code type may assume, namely 7, 10 or 14 days. These can be enumerate in some constant data structure (e.g., weeks) so that, for example, a duration of 14 days can be formalized with the number "2". Accordingly, any ListingDuration code type can only correspond to 7, 10 or 14 days. If the ListingDuration code type is attributed a value of 21 or 15, then such a value would violate the relevant XML schema definition.

According to one embodiment of the present invention, as and provides a "forced element" when encountering a value that violates an XML schema definition. Thus, a default value is provided as the enumerated code type can change over a period of time. Thus, in one month, an original XML schema definition may define 7, 10, 14 and 21 day duration values, but the next month, the updated up XML schema definition may be updated to remove the duration value of 21 days. Thus, when a client application 124, utilizing the original XML schema, attempt to provide a 21 day duration value against an updated API, this will be registered as a violation. To address this, the updated API will insert a "default value", which can carry any value, into the response payload 196 of a response message 176 provided by the updated API and to the according client application 124.

Thus, an indication of a 21 day duration value duration value against the updated API of the commerce system 12 will be accepted, but as the updated API will issue a warning to the relevant client application 124 that it needs to upgrade the relevant XML schema. In use, the default value is only inserted by the API server into the response message when the server detects that the client is using an outdated version of the schema.

Figure 10:
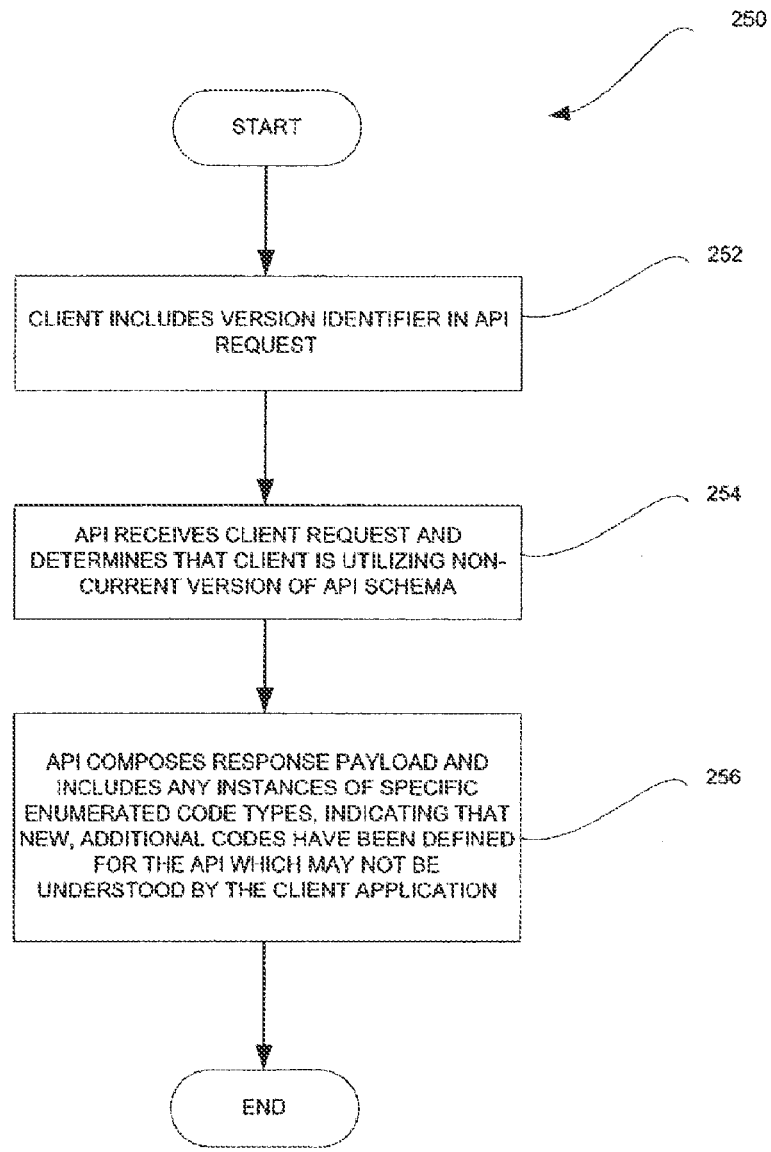
FIG. 10 is a flowchart illustrating a method, according to an embodiment of the present invention, of performing version management between a client application and an API.

FIG. 10 is a flowchart illustrating a method 250, according to an exemplary embodiment of the present invention, of performing version management between a client application 124 and an API, for example implemented by the commerce system 12. The method 250 illustrates how the API of the commerce system 12 leverages the business language schema design framework described above to communicate back to a client application 124 with client enumerated code types in a scenario in which the client application 124 may not be synchronized with a latest version of an API adopted by the commerce server 12.

The method 250 commences at block 252, with the client application 124 including its version identifier (e.g., version_ID), identifying the version of an XML schema definition stored by the client application 124, within a request message 158 addressed to a particular target API. An example of the version identifier 170 is provided below:

(Version xmlns="URN:marketplace:APIs:BLBase Components">383</Version>).

At block 254, an API 126 of the server system 125 receives the request message 158 from the client application 124, and determines from the version identifier that the client application 124 is utilizing a different and older version of an API schema supported by the relevant target API 126.

At block 256, the targeted API composes a response message 176, including a response payload 196, and includes within the payload instances of specific enumerated code types for an element (e.g., <Site>CustomCode</Site>). This indicates that the API has defined new, additional enumerated codes that may not be understood and correctly processed by the client application 124, in view of its updated XML schema definition for the targeted API. The "CustomCode" element being returned in such scenarios will prevent the client application 124 from experiencing a communication breakdown with the API, due to incremental schema changes and evolutions that may occur as part of the commerce system 12, for example, revising API-based application service offerings.

An enumerate code type examples follow hereunder:

---

GetUser with version 383 returns SiteCode of China

Example #1: API client has up-to-date version of API schema to communicate with XML Web Service APIs, e.g., GetUser API. Hence, the server system XML Web Service API returns the up-to-date enumeration code value ("China") for the <Site> enumerated code element.

```
<?xml version="1.0" encoding="utf-16"?>
<soap:Envelope xmlns:soap="http://schemas.xmlsoap.org/soap/envelope/"
xmlns:xsi="http://www.w3.org/2001/XMLSchema-instance"
xmlns:xsd="http://www.w3.org/2001/XMLSchema">
    <soap:Header>
        <RequesterCredentials xmlns="urn:marketplace:api:marketplaceAPI">
            <Credentials xmlns="urn:marketplace:apis:eBLBaseComponents">
                <AppId>dbeek</AppId>
                <DevId>apiteam</DevId>
                <AuthCert>apiteamcert</AuthCert>
                <Username>soapuser</Username>
                <Password>password</Password>
            </Credentials>
        </RequesterCredentials>
    </soap:Header>
    <soap:Body>
        <GetUserRequest xmlns="urn:marketplace:api:marketplaceAPI">
            <MessageID xmlns="urn:marketplace:apis:eBLBaseComponents">00cccc08-9875-43a0-97b8-8100a586af4f</MessageID>
                <Version xmlns="urn:marketplace:apis:eBLBaseComponents">383</Version>
                <EndUserIP
xmlns="urn:marketplace:apis:eBLBaseComponents">10.254.45.68</EndUserIP>
                <UserID>beekde_cn</UserID>
            </GetUserRequest>
    </soap:Body>
</soap:Envelope>
<?xml version="1.0" encoding="utf-16"?>
<soapenv:Envelope xmlns:soapenv="http://schemas.xmlsoap.org/soap/envelope/"
xmlns:xsd="http://www.w3.org/2001/XMLSchema"
xmlns:xsi="http://www.w3.org/2001/XMLSchema-instance">
    <soapenv:Body>
        <GetUserResponse xmlns="urn:marketplace:api:marketplaceAPI">
            <ns1:Timestamp
xmlns:ns1="urn:marketplace:apis:eBLBaseComponents">2004-11-24T19:15:52.586Z</ns1:Timestamp>
            <ns2:Ack
xmlns:ns2="urn:marketplace:apis:eBLBaseComponents">Success</ns2:Ack>
            <ns3:CorrelationID
xmlns:ns3="urn:marketplace:apis:eBLBaseComponents">00cccc08-9875-43a0-97b8-8100a586af4f        </ns3:CorrelationID>
            <ns4:Version
xmlns:ns4="urn:marketplace:apis:eBLBComponents">383</ns4:Version>
            <ns5:Build
xmlns:ns5="urn:marketplace:apis:eBLBaseComponents">20041119132302</ns5:Build>
            <ns6:User xmlns:ns6="urn:marketplace:apis:eBLBaseComponents">
                <ns6:AboutMePage>false</ns6:AboutMePage>
<ns6:EIASToken>nY+sHZ2PrBmdj6wVnY+sEZ2PrA2dj6wJkoelD5KKpgydj6x9nY+seQ==</ns6:EIASToken>
                <ns6:Email>Invalid Request</ns6:Email>
                <ns6:FeedbackScore>1</ns6:FeedbackScore>
                <ns6:FeedbackRatingStar>None</ns6:FeedbackRatingStar>
                <ns6:IDVerified>false</ns6:IDVerfied>
                <ns6:NewUser>true</ns6:NewUser>
                <ns6:RegistrationDate>2004-11-10T23:14:56.000Z</ns6:RegistrationDate>
                <ns6:Site>China</ns6:Site>
                <ns6:Status>Confirmed</ns6:Status>
                <ns6:UserID>beekde_cn</ns6:UserID>
                <ns6:UserIDChanged>false</ns6:UserIDChanged>
```

| GetUser with version 383 returns SiteCode of China |
| --- |

```
            <ns6:UserIDLastChanged>2004-11-
10T23:14:56.000Z</ns6:UserIDLastChanged>
        <ns6:BuyerInfo />
        <ns6:SellerInfo>
            <ns6:AllowPaymentEdit>false</ns6:AllowPaymentEdit>
            <ns6:CheckoutEnabled>true</ns6:CheckoutEnabled>
            <ns6:CIPBankAccountStored>false</ns6:CIPBankAccountStored>
            <ns6:GoodStanding>true</ns6:GoodStanding>
            <ns6:LiveAuctionAuthorized>false</ns6:LiveAuctionAuthorized>
            <ns6:MerchandizingPref>OptIn</ns6:MerchandizingPref>
            <ns6:QualifiesForB2BVAT>false</ns6:QualifiesForB2BVAT>
            <ns6:SellerGuaranteeLevel>NotEligible</ns6:SellerGuaranteeLevel>
            <ns6:SellerLevel>None</ns6:SellerLevel>
            <ns6:SchedulingInfo>
                <ns6:MaxScheduledMinutes>30240</ns6:MaxScheduledMinutes>
                <ns6:MinScheduledMinutes>0</ns6:MinScheduledMinutes>
                <ns6:MaxScheduledItems>1000</ns6:MaxScheduledItems>
            </ns6:SchedulingInfo>
            <ns6:StoreOwner>false</ns6:StoreOwner>
        </ns6:SellerInfo>
    </ns6:User>
  </GetUserResponse>
 </soapenv:Body>
</soapenv:Envelope>
Example #2: API client has upto-date version of API schema (as specified
            in <Version> sub-element in GetUserRequest message below) to
            communicate with XML Web Service APIs: GetUser API.
            Hence, XML Web Service API returns in response message:
            (a) the default enumeration code value ("CustomCode") for the
                <Site> enumerated code element; and,
            (b) the <Errors> sub-element also includes information to
                indicate to client that client's version of API schema
                is out of date:
                <Errors>
                    <ShortMessage>Warning. Client schema out of date. <ShortMessage>
                    <LongMessage>Warning. Client schema out of date. Client Schema
Version: 361.
                    Latest Schema Version: 347. LongMessage>
GetUser using 361 Version
<?xml version="1.0" encoding="utf-16"?>
<soap:Envelope xmlns:soap="http://schemas.xmlsoap.org/soap/envelope/"
xmlns:xsi="http://www.w3.org/2001/XMLSchema-instance"
xmlns:xsd="http://www.w3.org/2001/XMLSchema">
    <soap:Header>
        <RequesterCredentials xmlns="urn:marketplace:api:marketplaceAPI">
            <Credentials xmlns="urn:marketplace:apis:eBLBaseComponents">
                <AppId>dbeek</AppId>
                <DevId>apiteam</DevId>
                <AuthCert>apiteamcert</AuthCert>
                <Username>soapuser</Username>
                <Password>password</Password>
            </Credentials>
        </RequesterCredentials>
    </soap:Header>
    <soap:Body>
        <GetUserRequest xmlns="urn:marketplace:api:marketplaceAPI">
            <MessageID xmlns="urn;marketplace:apis:eBLBaseComponents">b54b5206-
901c-43ec-865f-86497e3bab5c</MessageID>
            <Version xmlns="urn:marketplace:apis:eBLBaseComponents">361</Version>
            <EndUserIP
xmlns="urn:marketplace:apis:eBLBaseComponents">10.254.45.68</EndUserIP>
            <UserID>beekde_cn</UserID>
        </GetUserRequest>
    </soap:Body>
</soap:Envelope>
<?xml version="1.0" encoding="utf-16"?>
<soapenv:Envelope xmlns:soapenv="http://Schemas.xmlsoap.org/soap/envelope/"
xmlns:xsd="http://www.w3.org/2001/XMLSchema"
xmlns:xsi="http://www.w3.org/2001/XMLSchema-instance">
    <soapenv:Body>
        <GetUserResponse xmlns="urn:marketplace:api:marketplaceAPI">
            <ns1:Timestamp
xmlns:ns1="urn:marketplace:apis:eBLBaseComponents">2004-11-
24T19:16:41.445Z</ns1:Timestamp>
            <ns2:Ack
xmlns:ns2="urn:marketplace:apis:eBLBaseComponents">Warning</ns2:Ack>
            <ns3:CorrelationID
```

-continued

| GetUser with version 383 returns SiteCode of China |
|---|
| xmlns:ns3="urn:marketplace:apis:eBLBaseComponents">b54b5206-901c-43ec-865f-86497e3bab5c        </ns3:CorrelationID>
      <ns4:Errors xmlns:ns4="urn:marketplace:apis:eBLBaseComponents">
        <ns4:ShortMessage>Warning. Client schema out of date.
</ns4:ShortMessage>
      <ns4:LongMessage>Warning. Client schema out of date. Client Schema Version: 361. marketplace Latest Schema Version: 347. </ns4:LongMessage>
      <ns4:ErrorCode>14003</ns4:ErrorCode>
      <ns4:SeverityCode>Warning</ns4:SeverityCode>
      <ns4:ErrorParameters ParamID="0">
        <ns4:Value>361</ns4:Value>
      </ns4:ErrorParameters>
      <ns4:ErrorParameters ParamID="1">
        <ns4:Value>347</ns4:Value>
      </ns4:ErrorParameters>
      </ns4:Errors>
      <ns5:Version xmlns:ns5="urn:marketplace:apis:eBLBaseComponents">383</ns5:Version>
      <ns6:Build xmlns:ns6="urn:marketplace:apis:eBLBaseComponents">20041119132302</ns6:Build>
      <ns7:User xmlns:ns7="urn:marketplace:apis:eBLBaseComponents">
        <ns7:AboutMePage>false</ns7:AboutMePage>
<ns7:EIASToken>nY+sHZ2PrBmdj6wVnY+sEZ2PrA2dj6wJkoelD5KKpgydij6x9nY+seQ==</ns7:EIASToken>
        <ns7:Email>Invalid Request</ns7:Email>
        <ns7:FeedbackScore>1</ns7:FeedbackScore>
        <ns7:FeedbackRatingStar>None</ns7:FeedbackRatingStar>
        <ns7:IDVerified>false</ns7:IDVerified>
        <ns7:NewUser>true</ns7:NewUser>
        <ns7:RegistrationDate>2004-11-10T23:14:56.000Z</ns7:RegistrationDate>
        <ns7:Site>CustomCode</ns7:Site>
        <ns7:Status>Confirmed</ns7:Status>
        <ns7:UserID>beekde_cn</ns7:UserID>
        <ns7:UserIDChanged>false</ns7:UserIDChanged>
        <ns7:UserIDLastChanged>2004-11-10T23:14:56:000Z</ns7:UserIDLastChanged>
        <ns7:BuyerInfo />
        <ns7:Sellerinfo>
          <ns7:AllowPaymentEdit>false</ns7:AllowPaymentEdit>
          <ns7:CheckoutEnabled>true</ns7:CheckoutEnabled>
          <ns7:CIPBankAccountStored>false</ns7:CIPBankAccountStored>
          <ns7:GoodStanding>true</ns7:GoodStanding>
          <ns7:LiveAuctionAuthorized>false</ns7:LiveAuctionAuthorized>
          <ns7:MerchandizingPref>OptIn</ns7:MerchandizingPref>
          <ns7:QualifiesForB2BVAT>false</ns7:QualifiesForB2BVAT>
          <ns7:SellerGuaranteeLevel>NotEligible</ns7:SellerGuaranteeLevel>
          <ns7:SellerLevel>None</ns7:SellerLevel>
          <ns7:SchedulingInfo>
            <ns7:MaxScheduledMinutes>30240</ns7:MaxScheduledMinutes>
            <ns7:MinScheduledMinutes>0</ns7:MinScheduledMinutes>
            <ns7:MaxScheduledItems>1000</ns7:MaxScheduledItems>
          </ns7:SchedulingInfo>
          <ns7:StoreOwner>false</ns7:StoreOwner>
        </ns7:SellerInfo>
      </ns7:User>
    </GetUserResponse>
  </soapenv:Body>
</soapenv:Envelope> |

Figure 11:
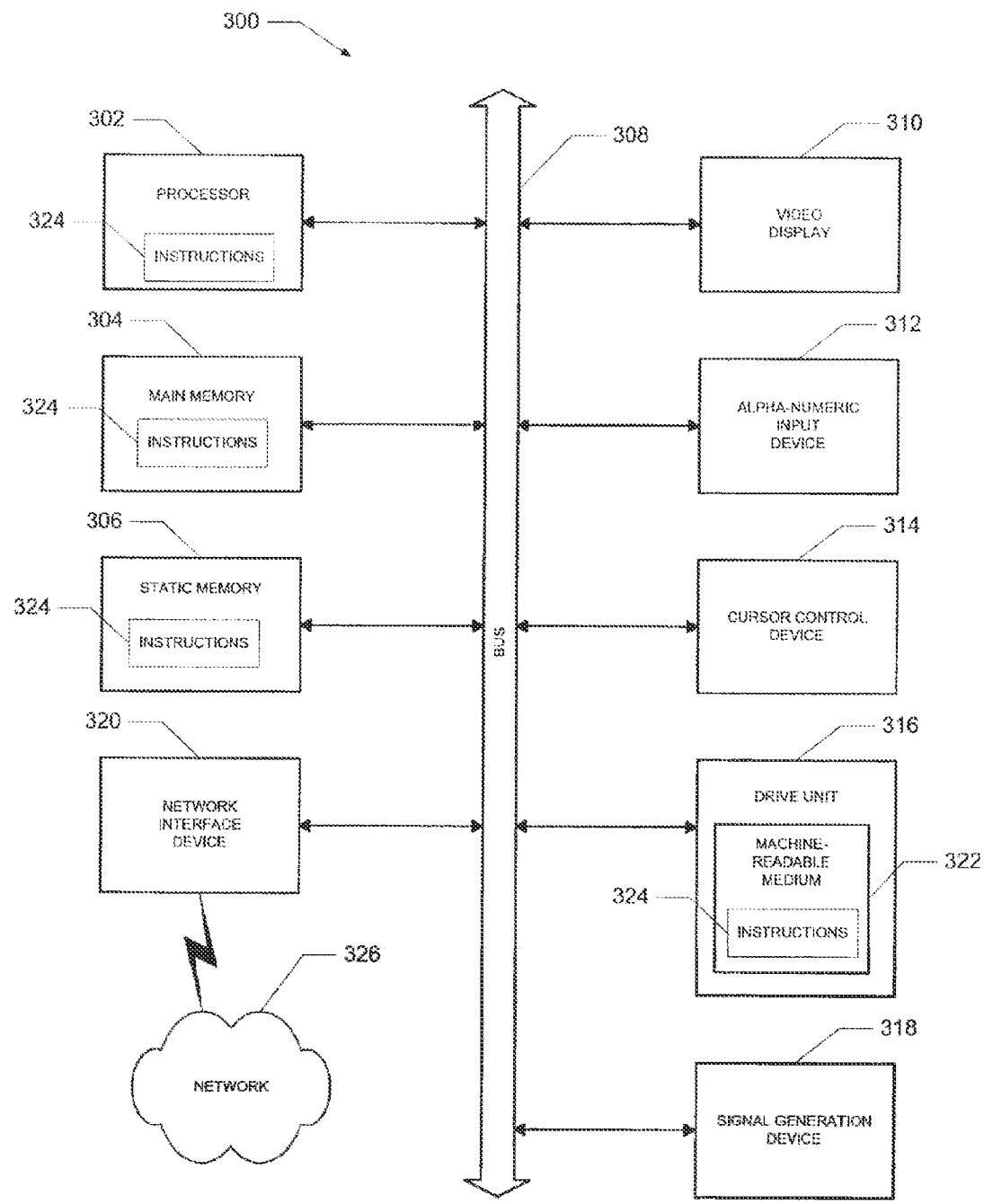
FIG. 11 is a block diagram representation of a machine, in the exemplary form of a computer system, within which a set of instructions for causing the machine to perform any one or more of the methodologies discussed herein may be executed.

FIG. 11 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical media and magnetic media.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A server system in an electronic trading system to facilitate an exchange of messages with a remote client application, the server system including:
    a plurality of application servers, including one or more hardware processors, hosting a plurality of business applications; and
    a plurality of application program interface servers hosting a plurality of Application Program Interfaces (APIs) to provide programmatic access to the plurality of business applications, each of the APIs are configured to receive request messages compiled from the remote client application,
    the first and second request messages, respectively target first and second APIs of the plurality of APIs, each API comprises at least one common data component, and
    the first request message includes a first payload specific for the first targeted API and the second request message includes a second payload specific for the second targeted API, the first payload and the second payload each comprise a reusable identified schema definition specific to the API that is targeted.

2. The system of claim 1, wherein the at least one data component is selected from a group comprising a predetermined required level of detail, an error language component and a version identifier.

3. The system of claim 1, wherein each of the plurality of APIs is configured to generate a response message that is sent to the remote client application, responsive to a received request message.

4. The system of claim 3, wherein the response message includes an acknowledgement component for acknowledging receipt of the request message, a correlation identifier, a timestamp, error data and version data.

5. A method of facilitating an exchange of messages between a remote client application and a server system, the server system being capable of supporting a plurality of application program interfaces (APIs) that includes a targeted API, the method including:
    receiving a plurality of request messages generated by the remote client application, each request message requesting an activity to be performed by the targeted API, with respect to an associated application, and comprising at least one data component that is common to each of the plurality of request messages, and a request component including a reusable identified schema definition specific to the targeted API;
    extracting the at least one data component and the request component from the request message; and
    performing the activity requested by the request message.

6. The method of claim 5, including performing version and error check operations.

7. The method of claim 5, including generating a response message that is sent from the server system to the remote client application.

8. A method according to claim 7, wherein the generating of the response message includes generating an acknowledgement, a timestamp, a correlation identifier, error data and version data.

9. A non-transitory machine-readable storage device comprising instructions which, when executed by a machine, cause the machine to perform operations of facilitating an exchange of messages in a trading system between a remote client application and a server system, the server system being capable of supporting a plurality of application program interfaces, the operations comprising:
    receiving a plurality of request messages compiled by the remote client application, each of the plurality of request messages comprising at least one data component that is common to each of the plurality of request messages, and a request component that includes a reusable identified schema definition specific to one of the plurality of application program interfaces, to support the functionality of the requested application program interface;
    extracting the at least one data component and the request component from the request message; and
    performing the activity requested by the request message.

10. The non-transitory machine-readable storage device of claim 9, the operations further comprising performing version and error check operations.

11. The non-transitory machine-readable storage device of claim 9, the operations further comprising generating a response message that is to be sent from the server system to the remote client application.

12. The non-transitory machine-readable storage device of claim 11, the operations further comprising generating an acknowledgement, a timestamp, a correlation identifier, error data and version data.

* * * * *